J. T. QUIGLEY.
LABOR COST RECORDING DEVICE.
APPLICATION FILED DEC. 29, 1908.
932,575.
Patented Aug. 31, 1909.
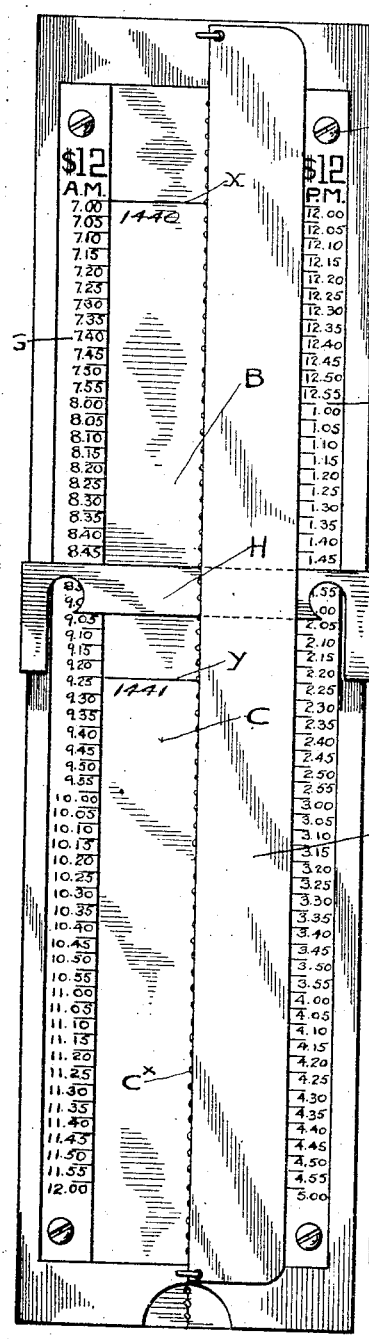
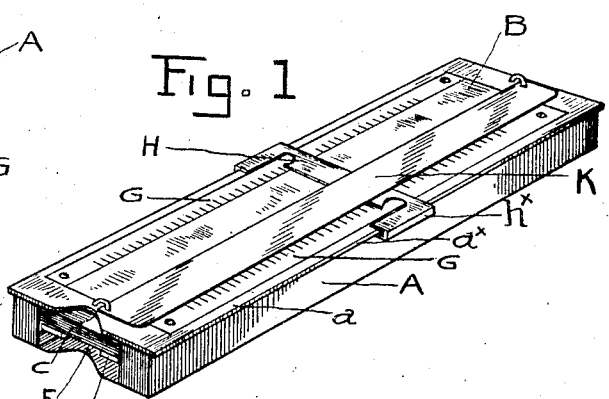
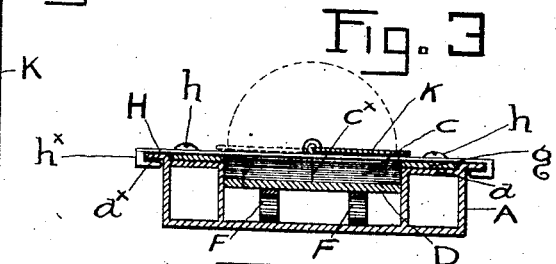
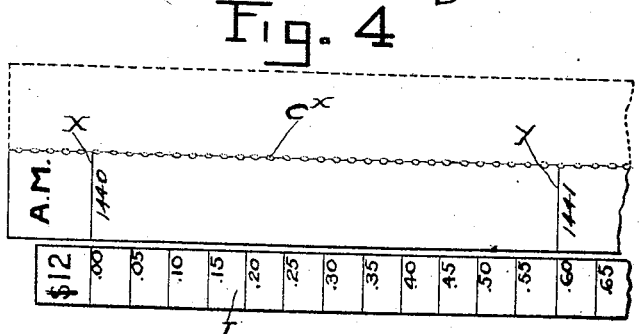
WITNESSES:
INVENTOR
John T. Quigley
ATTORNEYS

UNITED STATES PATENT OFFICE.

JOHN T. QUIGLEY, OF SAN FRANCISCO, CALIFORNIA.

LABOR-COST-RECORDING DEVICE.

932,575.  Specification of Letters Patent.  Patented Aug. 31, 1909.

Application filed December 29, 1908. Serial No. 469,751.

*To all whom it may concern:*

Be it known that I, JOHN T. QUIGLEY, a citizen of the United States, and a resident of the city and county of San Francisco and State of California, have invented new and useful Improvements in Labor-Cost-Recording Devices, of which the following is a specification.

This invention has as its object chiefly to provide means for recording the time expended by an operative on a given piece of work, and for converting the time as recorded into equivalent money value according to the rate of wages or compensation paid.
To such end and object this invention consists in a novel means or device for expressing the time expended on a given piece of work in terms of linear measure according to a predetermined scale in which the units of linear measure, such as fractional parts of an inch, represent the compensation of the operative for such expressed time according to any given scale of wages.

The invention embraces also a novel means or device for recording the time expended by an operative on a given piece of work in terms of linear measure in which the units or divisions of such measure also represent equivalent units or fractional parts of the fixed wages or compensation of the operative for a definite work-period, according to the ruling rate of wages; the record produced by the device being embodied in a permanent form for future reference.
The invention embraces further a case or holder of novel construction having an aperture exposing to sight and access a card or a tablet to receive the record, and adjacent to said aperture a scale of linear measure in which the units or divisions are graduated to represent fractional parts of the time of a given work-period and also equivalent fractional parts of a selected scale, the units of which represent a fixed money value in dollars and cents, according to the compensation paid.

The nature of the said invention and the manner in which I produce, apply and carry out the same are fully explained in the following description, in which reference is had to the accompanying drawing:—

Figure 1 of the drawing represents in perspective the recording device of my invention, in which the parts are adjusted or set ready for recording the time of an operative between the time of beginning work in the morning and the intermission at noon. Fig. 2 is an enlarged plan or top-view of the device illustrated in Fig. 1. Fig. 3 is a cross-section of the device taken on the line *x—x* Fig. 2. Fig. 4 represents a portion of the record-strip removed from the device, and a portion of the linear-measure scale provided for determining the money-value of the marked portion of the record-strip.

A indicates a box-like case, preferably of rectangular shape, with a flat top *a*, in which is an aperture B for exposing to sight and also to access from the outside a greater or less portion or area of the top face of the card or tablet C.

Within the case and beneath the aperture is a movable bed or support D for the card or tablet, and in one end of the case is an opening E for conveniently introducing and removing it. The bed D being somewhat larger in dimensions than the aperture in the case, the card C is clamped between the bed and the marginal edges of the aperture, thus insuring a fixed position of the card beneath or behind the top-plate. The bed D is held up with sufficient pressure or force against the top-plate or cover *a* preferably by springs F placed under the bed, as shown in Fig. 3, so that the card may be readily withdrawn through the opening E after the record is made on its surface. Usually the case is made sufficiently deep to admit a pad or a stack of cards or tablets and thereby avoid the necessity of placing a new one in the holder every time the top one bearing the record is removed.

On the exposed surface of the top-card of the stack the operative proceeds to record the time of beginning and the time of stopping work, also indicating such periods or intervals of interruption or cessation of work as are provided for by custom or the rules of the shop; such records being made by marking a line across the face of the tablet at the proper division of the time scale; or by printing characters on the record-surface at the required points by a stamp or printing pad; or by using other means convenient for the purpose. Such record-marks are indicated as an example in Fig. 2 where the line *x* on the tablet marks the time of 7 o'clock when the operative has begun work, and the line *y*, the time when he ceased work on a particular job numbered 1440 and the length of that portion of the record included between the record-marks *x—y* will then represent both the time expended by the operative, and also the cost or value of such period of time in dollars and cents, according to the wage-rate of the operative by virtue of the peculiar arrangement and graduation of the scale G. According to the rate of wages commanded by the operative in this particular illustration, the divisions of this scale G on the case are graduated conformably to the rate of twelve dollars per week of forty-eight working hours a regular increase of five minutes of each division over the next. The graduations also conform to and indicate definite fractional parts of linear measure according to the arbitrarily selected scale in which six inches represent one dollar in money. The result of constructing or laying off the scale G on this plan is to give the record tablet, or whatever record medium may be applied to and marked from the scale, a definite value in length, not only as to hours and fractional parts of an hour, but also as to dollars and fractional parts of a dollar according to the controlling wages or compensation. It becomes only necessary therefore to measure the length of the record-surface between the record-marks by means of the scale to ascertain the cost of the recorded work period.

In the present embodiment of my invention wherein the device is adapted to record and determine the labor cost of work on the basis of twelve dollars per week of six eight-hour work periods, the divisions of the scale to guide the operative in making the records on the tablet are graduated along one side of the aperture in the case to indicate intervals of five minutes, beginning with seven o'clock in the morning, and ending with twelve o'clock noon; and along the opposite side of the aperture to indicate corresponding five minute intervals beginning with twelve o'clock noon and ending with five o'clock, the close of the afternoon work-period, the graduations spaced uniformly at such intervals apart that the number of graduations included in a length of six inches of linear measure will represent four hours of time and one dollar in money which is the money-value of a work-period of four hours, according to the operative's scale of wages at two dollars per day of eight hours. The divisions of the scale G thus have a definite value in money according to the governing rate of wages, and consequently the length of that portion of the record-strip which is included between the time-record marks made by the operative will indicate both the time expended by the operative and the cost of such time in dollars and cents. This scale of six inches equal to one dollar selected as convenient for general use, has been found to work well for many different rates or scales of wages; but where it may be found expedient to employ other proportions of linear measure, it is only necessary to space the divisions or intervals of the time-scale G to conform to the governing rate of wages, with such reference to the unit of the money scale adopted that such unit of linear measure, whether it be six inches equal one dollar or any other selected proportion, that the units in the time-scale shall conform to the wage scale of the operative per hour or fractional parts of an hour.

By dividing the time-scale G into morning section and afternoon section as illustrated in Fig. 1, and arranging them along the opposite sides of the aperture in the top plate, I am able to bring the device within a comparatively small compass, and thereby reduce the length of the record-card or tablet required in recording a full work day of eight hours or more.

A double record-tablet C or one separable into two sections by a line of perforations or indentations $c^x$ through the middle furnishes a convenient medium on which to record separately the time in the morning period and the afternoon period of a work-day. This double strip is readily inserted in the holder and held in position to receive the record without requiring separate means to retain it in place. It also permits the record to be reduced to the dimensions of a narrow strip or tape by separating it on the line of perforations and joining the two strips end to end.

In one way the graduations of the scale G are marked or inscribed directly upon the top-plate $a$ along the edges of the aperture. In another way, they may be marked on a separate strip $g$ and afterward secured to the top-plate by screws $h$ as seen in Fig. 3. This latter mode has the advantage of permitting the scale to be adjusted or changed on the case to conform to changes in the rates of wages as the same are affected from time to time.

The movable straight edge H is provided for the convenience of the operative in marking the record lines on the tablet with greater accuracy opposite the graduations of the scale. It is not an important part of the recording means and it may be removed or dispensed with. It has the advantage, however, of insuring always a correct and true placing of the record-marks opposite the graduations of the scale.

The ends $h^x$ of this slide H are grooved to embrace the sides $a^x$ of the case, which project and are turned outward horizontally for that purpose. It is fitted to slide smoothly over the top-plate while preserving a position transversely across the face of the record-surface.

The case A is usually provided further with a flap or cover K of about one half the dimensions in width of the record-surface, but of sufficient length to cover the surface from top to bottom on one half of the longitudinal median line of the aperture. The function of this flap is to cover the half or portion of the record surface that is not in immediate use, and thus expose to sight and access only that half which is required during either the morning hours or the afternoon hours of the work-period. For readily adjusting or changing this flap K from one side to the other it is hinged or loosely attached at one edge to the top-plate *a*. On these points as a hinge it is readily changed from one side of the longitudinal middle line to the other as required.

For greater convenience in determining the money value of the record-card C after it has been marked from the graduations on the case the record-card is applied to the scale I in which the graduations conform to and represent fractional parts of the unit of six inches linear measure, and also equivalent fractional parts of one dollar, and from these graduations the money value of the linear dimensions of the record-tablet is readily determined.

The dimensions of the record-strip illustrated in Fig. 4 in connection with the scale I as an example, is seen to have a value of 60 cents for the portion included between the record-marks *x—x* according to the scale I, as well as a time-value of two hours and twenty-five minutes according to the scale from which the record was marked before the card was removed from the case.

In adapting the device to other scales of wages or compensation on the basis of six inches linear measure representing one dollar it will be evident that the graduations of the time record scale G will be spaced farther apart proportionately to the increase in the wage-scale, because the operative commanding the higher rate of wages will be entitled to a greater length of record than one receiving lower wages for the same work period recorded by means of this device.

I claim:—

1. A labor cost recording device comprising a case having an aperture for exposing to sight and access a record-receiving surface and a scale adjacent to said aperture graduated conformably to a predetermined scale of linear measure in which the graduations represent fractional parts of a work-period in hours and minutes, and also equivalent fractional parts of the cost of such work-period, according to a given rate of wages.

2. A labor cost recording device comprising a case having an aperture for exposing to access a record-receiving surface, means for removably retaining a record-tablet therein, and a scale adjacent to the edge of said aperture having its graduations conforming to a scale of linear measure in which the divisions represent both fractional parts of a given work-period in hours and minutes and also equivalent fractional parts of the cost of such work-period according to the controlling rate of wages.

3. In a device of the character described, the combination of a case, a record-receiving tablet removably held therein; and a time-scale adjacent to said aperture, the said scale being graduated conformably to a scale of linear measure wherein the graduations represent equivalent parts of the governing wages or compensation for the given work-period represented by such time scale.

4. In a labor cost recording device, the combination of a record receiving means, a holder therefor, a time scale upon said holder, the said scale being graduated conformably both to a scale of linear measure the units of which represent units of money and to the rate of wages for the given work period represented by such time scale.

JOHN T. QUIGLEY.

Witnesses:
M. REGNER,
P. S. PIDWELL.